March 3, 1970    M. LEWIS    3,498,482

TRUCK-BODY UNLOADING APPARATUS

Filed July 30, 1968

INVENTOR.
MILBURN LEWIS
BY Ford E. Smith
ATTORNEY

United States Patent Office 3,498,482
Patented Mar. 3, 1970

3,498,482
TRUCK-BODY UNLOADING APPARATUS
Milburn Lewis, Seattle, Wash., assignor to Western Sawdust Products, Inc., Seattle, Wash., a corporation of Washington
Filed July 30, 1968, Ser. No. 748,723
Int. Cl. B60p 1/00
U.S. Cl. 214—83.22                5 Claims

ABSTRACT OF THE DISCLOSURE

A truck body having sidewalls is provided with a rearwardly movable front wall and a load-carrying belt to discharge cargo at the tailgate. The belt and the movable front wall of the body are associated together. By means of a lost-motion connection, an initial load-loosening movement of the belt, prior to front wall movement, is provided. When the cargo is compactable material and has been subjected to vibration during transport, the preliminary loosening of the material relative to the sidewalls of the truck body and discharge facilitates unloading.

Background

Vehicles having power-actuated belts on which a load is carried between the vehicle body sidewalls are known. It is also known to provide a movable front wall associated with such belt to travel therewith in the discharge of the cargo. However, it has been discovered that where the cargo is particulate or discrete as, for example, sawdust, wood chips, humus, and materials of that nature, compaction of the cargo takes place due to vibratory forces occurring during transport. The cargo settles downward and spreads sideways into tight engagement with the walls and bottom of the vehicle body. This causes difficulty in initiating movement of the load-carrying and material discharging belt means and of the movable front wall. Excess-capacity power means and extra rugged belt and front wall structures appear to have been the only prior solution to the problem of unloading or discharging a compacted load. It is a primary object of this invention to overcome such difficulty; and to do so with efficient means of simple construction and operation.

Summary

A vehicle having a load-containing enclosure, including a bed, sidewalls and openable rear walls, is provided with a conveyor belt extending along the bed between the sidewalls from the front to the rear of the vehicle body. The front end of the belt is secured to the movable front wall preferably by means of a roller journalled thereon. Lost motion connection means are established between the belt and the front wall. Means is provided to impart a rearward draft on the belt and to initially move the same without accompanying initial movement of the front wall for purposes of loosening the cargo. Draft means is connected with the roller associated with the front wall to draw the same and the front wall to the normal forward position. Such means also operates so that a portion of the front of the belt is rolled up in addition to the accompanying movement of the front wall.

Drawings

Figure 1:
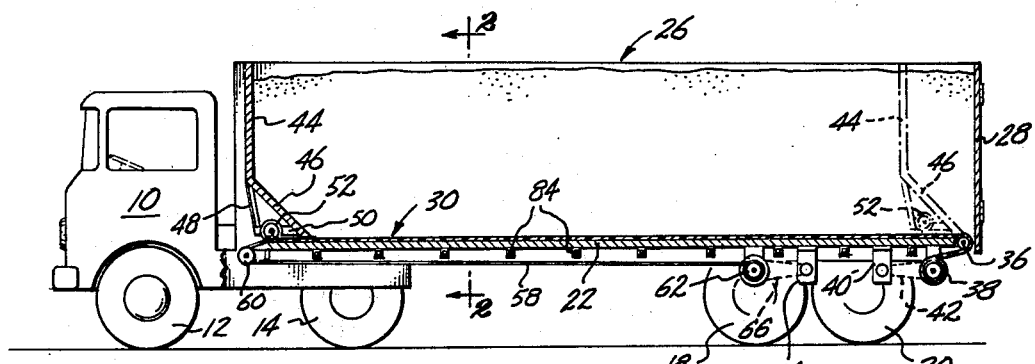
Figure 2:
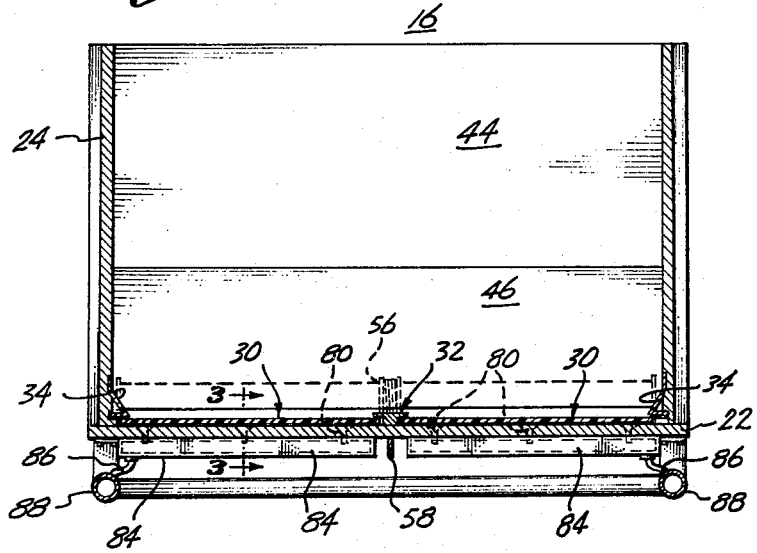
Figure 3:
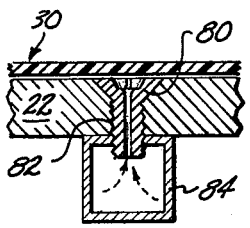
Figure 4:
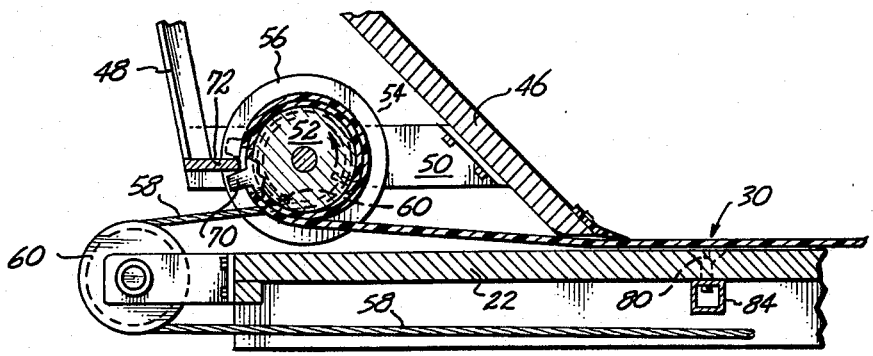

FIG. 1 is a side view of a vehicle incorporating the invention with portions shown in cross section for convenience of illustration;
FIG. 2 is a vertical cross section taken on line 2—2 of FIG. 1;
FIG. 3 is an enlarged cross sectional detail taken on line 3—3 of FIG. 2; and
FIG. 4 is an enlarged detail, partially in section showing the mode of connecting and imparting draft to a load carrying belt of this invention.

Description of the invention

A vehicular prime mover 10 mounted on wheels 12 and 14 provides power and forward support for a semi-trailer unit 16 having rear wheels 18 and 20. It will be understood that the forward end of the trailer unit 16 is suitably connected in a conventional manner to the rear of the prime mover 10.

Unit 16 includes a bed 22, sidewalls 24, 26 and an openable rear wall or tailgate 28. A conveyor belt 30 extends substantially the length of bed 22 between sidewalls 24, 26. While it is apparent that the belt 30 may extend the full width of the bed between the sidewalls, in FIG. 2 the belt is shown as divided into two runs, i.e., is longitudinally divided with the adjacent inner edges disposed under T-shaped central strip 32. At the side edges a tapered or inwardly sloped flange 34 carried by each sidewall overhangs the belt edges to preclude discrete material getting under the edges of the belt means. This arrangement also forms a relatively restricted air escape passage as will be more fully described. At the rear of bed 22, belt 30 passes over tail roller 36 and thence around roller or spool 38 which is caused to rotate by power supplied from unit 40 to endless drive means 42.

At the front of the vehicle is forward wall 44 which preferably has rearward facing inclined portion 46. Wall 44 overlies the front portion of belt 30. Bracket structure 48, 50, forwardly attached to front wall 44 and the sloping portion 46, supports belt roller 52. A front end portion of belt 30 is wrapped about roller 52 and secured thereto by fastenings 54. Sheave 56 is associated with roller 52 which is journalled in member 50 of the bracket structure. A cable 58 is anchored at 60 to sheave 56 and passes over guide sheave 60 at the front of bed 22, thence to cable drum 62 powered by unit 64 through drive belt 66, as may be seen in FIG. 1.

A lug 70 on sheave 56 interengages with a boss 72 which is part of the bracket structure 48, 50.

When power is applied to the belt 38 at the rear of the vehicle, a draft is imparted on the belt. This initially unwraps a forward portion of the belt 30 from around roller 52 and causes roller 52 to rotate in a counterclockwise direction, as may be seen in FIG. 4. Lug 70 likewise rotates in the same direction until it reengages with the upper side of boss 72. Under such circumstances as just described, further draft in a rearward direction imparted to belt 30 will cause front wall 44 and its sloping portion 46 to move rearwardly in a load-discharging manner. With the tailgate 28 open, the load will be displaced therethrough. The rearward disposition of wall 44, when a load has been completely discharged, is shown by dotted lines in FIG. 1.

As wall 44, 46 and the structure associated therewith, including roller 52 moves rearward, cable 58 was unreeled from winch 62.

When it is desired to return wall 44, 46 to its forward position, power is supplied to unit 64 and the belt 66 to cause the winch 62 to respool cable 58. This produces the desired forward acting force to return wall 44 to its front position to unroll belt 30 from roller 38.

Bed 22 has a plurality of flat-faced nozzles 80 spaced over and throughout in the upper surface underlying belt 30. Nozzles 80 have axial orifices 82 and their lower ends are in communication with the interior of a cross manifold 84 in turn connected by tubes 86 (see FIG. 2) with longitudinal manifold 88. Means (not shown) supplies air under pressure to manifold 88 and air distributing system 84, 82 and 80 whereby air under pressure is delivered to the orifices of the numerous nozzles 80. Such air is delivered at a pressure sufficient to raise and support belt 30 in spaced relation above the deck or bed 22. It is not practical or particularly desirable to completely seal the edges of the moving load-bearing belt against the escape of air, but this presents no serious handicap. In fact, it is desirable that there be air escape along the edges of the belt since this functions, when extremely finely discrete materials are handled, to prevent the same from lodging either under the overhanging members 32 and the inner belt edges or under the sloping flange 34 with relation to the outer belt edges. The escaping air also prevents material penetrating under the belt during its transport rearward.

The air system described comprises friction-reducing and air support means between the loaded belt and the underlying bed or deck of the conveying enclosure 16. It often occurs with discrete material of the nature of humus, sawdust, papermill wood chips or like materials that, as the same are transported from place to place, vibration, jolting, jiggling and other movement encountered tends to compact the load downward and sideward. A high frictional engagement between the load and the means enclosing and supporting the same results. This engagement is particularly noticeable with respect to the sidewalls in the vehicle enclosure. The roller 52 and the front portion of the belt 30 being wrapped therearound provides a lost-motion connection between the belt and the front wall 44, 46. By means of this connection when a rearward draft is supplied to the belt, the belt first moves independent of wall 44, 46 as it unwraps from roller 52. When this unwrapping rotation of roller 52 is terminated by interengagement between lug 70 and boss 72, wall 44 begins to move with the belt. This initial movement of the belt tends to break the frictional engagement between the load and the sidewalls of the enclosure; in other words it loosens the load. Thereafter the front wall movement in effect plows out the load with respect to the side walls and forces it rearward where it is discharged over the end roller 36.

It will be understood that changes and alterations in form and structure may be employed to meet varying conditions. However, it will be understood that all such as by a reasonable interpretation of the rule of equivalents as are equivalent to the structures and forms shown herein are intended to be covered by this patent.

What is claimed is:
1. Apparatus for unloading compactable discrete materials from a vehicle having a load-containing enclosure including a bed, sidewalls and an openable rear wall, comprising:
   a conveyor belt extending along said bed between the sidewalls of the enclosure;
   a movable front wall above said belt adjacent its forward end and including a roller journalled thereon, the forward end of said belt being secured to said roller with a predetermined forward belt portion normally wrapped thereabout;
   means to impart a rearward draft on said belt to initially unwrap said belt from said roller and then cause said belt and said front wall to move rearwardly in a load-discharging manner;
   draft means connected with said roller operable to draw the same forward and to impart belt wrapping rotation thereto; and
   stop means limiting the rotation of said roller.
2. Apparatus according to claim 1 in which the stop means restrict rotation of said roller to approximately one rotation in either direction.
3. Apparatus according to claim 1 in which the draft means connected with the roller comprises a spool having a winch-powered cable secured thereto, and interengaging members on the spool and on the front wall limit rotation of said roller in opposite direction.
4. Apparatus according to claim 1 in which means is provided to air support said belt relative said bed during movement of said belt thereover.
5. Apparatus according to claim 4 in which the means for air supporting the belt comprises a plurality of orifices spaced over said bed to meet the belt, and means is included to deliver air under pressure to the orifices from beneath.

References Cited
UNITED STATES PATENTS 2,514,843    7/1950    Clement _____ 214—83.22
3,342,354    9/1967    Behr _____ 214—83.22

ALBERT J. MAKAY, Primary Examiner

U.S. Cl. X.R.

198—184